PREPAY PAYSTATION TELEPHONE ARRANGEMENT

Filed Sept. 16, 1958 5 Sheets-Sheet 1

INVENTOR.
CLARENCE E. LOMAX
BY C. R. Sipe
ATTY.

PREPAY PAYSTATION TELEPHONE ARRANGEMENT

Filed Sept. 16, 1958 5 Sheets-Sheet 2

TRUNK CKT. 100

INVENTOR.
CLARENCE E. LOMAX
BY C. R. Sipe
ATTY.

April 23, 1963 C. E. LOMAX 3,087,017

PREPAY PAYSTATION TELEPHONE ARRANGEMENT

Filed Sept. 16, 1958 5 Sheets-Sheet 3

INVENTOR.
CLARENCE E. LOMAX

BY C. R. Sipe

ATTY.

PREPAY PAYSTATION 400

INVENTOR.
CLARENCE E. LOMAX
BY C. R. Sipe
ATTY.

PREPAY PAYSTATION TELEPHONE ARRANGEMENT

Filed Sept. 16, 1958 5 Sheets-Sheet 5

TRUNK CKT. 500

PULSE SENDER 570

INVENTOR.
CLARENCE E. LOMAX
BY C. R. Sipe
ATTY.

United States Patent Office 3,087,017
Patented Apr. 23, 1963

3,087,017

PREPAY PAYSTATION TELEPHONE ARRANGEMENT

Clarence E. Lomax, Hastings, Nebr., assignor to Automatic Electric Laboratories, Inc., a corporation of Delaware Filed Sept. 16, 1958, Ser. No. 761,374
4 Claims. (Cl. 179—6.3)

The present invention relates in general to a telephone system and more particularly to a prepay paystation arrangement utilized in a telephone system.

It has been common practice in the past on paystation calls to an operator's position, either via a manual system or an automatic system, that the operator was obliged to make a refund or collect operation by operating keys at her disposal. In certain automatic systems the answering of a toll call by the operator automatically initiates means for refunding a deposited coin, that is when the operator inserts her plug into the operator's position jack. Also, it has been common practice to signal an operator of an impending toll call before making a refund or collection thus delaying the extension of a call. Furthermore, even in such above systems, if the refund was a failure the operator often had no indication that the refund was a failure until the calling party notified the operator of the failure, thus requiring a further manual operation on the part of the operator to refund the coin deposit.

The instant disclosure represents a practical application of the use of an improved prepay paystation circuit with improved common primary and combined line and recording trunk circuits in a paystation telephone system, whereby the disposal of an initial coin deposit on toll calls is initiated upon seizure of the combined line and recording trunk circuit, with signalling of the toll operator being prevented until one cycle of the coin disposal operation has taken place. The provision of these improved circuit arrangements represents a saving of equipment and time and a decrease in the responsibility of the operator, resulting in a greater number of toll calls being extended and supervised by a single operator than has been done in the past, thus providing a more efficient and economical paystation telephone system. Applicant's improved circuit arrangements further present similar advantages over the above-mentioned previous systems that automatically dispose of the coin deposit in response to the operator answering the toll call. These circuit arrangements present a further advance over the above-mentioned known paystation telephone systems in that if the coin disposal operation was a failure the operator is signalled, after plugging in to answer the call, of said failure of the coin disposal operation. An improved circuit arrangement at the paystation and in the primary trunk relates to an additional advance, which prevents fraudulent attempts by a calling paystation, upon termination of a call, at stopping the collection of the prior coin deposit in order to obtain free calls.

As applied to the paystation telephone system, the primary object of my invention is to provide economical and improved paystation circuits and common primary and combined line and recording trunk circuits arranged for use in a prepay paystation telephone system, whereby coin disposal connections are established subsequent to the initiation of a paystation call in a fast, efficient and reliable manner.

Another object of my invention is to provide improved prepay paystation circuits for use with improved common trunk circuits, whereby on paystation calls requiring the assistance of an operator, the initial coin disposal operation takes place before the operator is signalled.

In accordance with the above-named objects, a feature of the present invention relates to the provision of means in the combined line and recording trunk circuit for initiating a coin refund operation in response to seizure of the trunk circuit.

Another feature of the present invention relates to the provision of means in the combined line and recording trunk circuit for delaying the extension of a call signal to the operator until one cycle of the above-mentioned coin refund operation has taken place.

Another feature of the present invention relates to the provision of means in the combined line and recording trunk circuit for indicating a coin refund failure to the operator, subsequent to the answering of a call signal by the operator.

Still another feature of the invention relates to the provision of means in the paystation circuit in combination with means in the common primary trunk circuit for preventing the calling paystation from interfering with the collect operation of a coin deposit upon termination of a call.

Another feature of the invention relates to means in the paystation circuit in combination with the trunk circuit, whereby receipt of inductive current surges therefrom are prevented from initiating false coin disposal operations.

These and other features of the invention will become apparent from a perusal of the following specification taken in combination with the accompanying drawings, in which.

Figure 1:
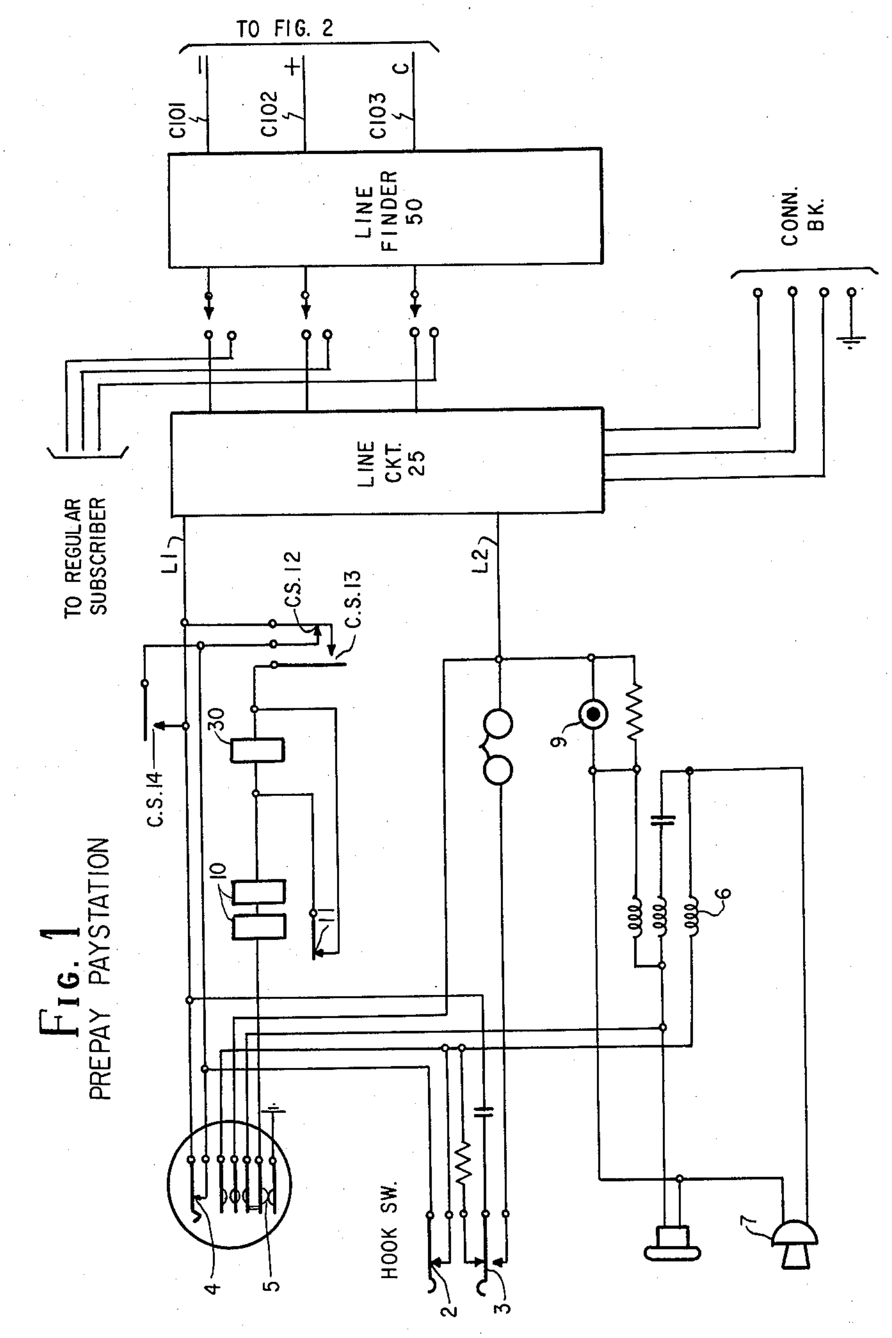
FIGS. 1 and 2 illustrate the paystation circuit arrangement and Trunk Circuit 100, the latter being located between a Finder 50 and a Selector 200 for furnishing high voltage refund and collect potential to the paystation on the extension of a toll call and the termination of a connection respectively established therefrom.

Referring briefly to the paystation illustrated in FIG. 1, a modified prepay paystation circuit is shown, differing from those well known in that springs are placed on the dial for the purpose of opening the coin magnet circuit when pulses are being sent. The numeral 10 on the drawing represents the usual coin magnet and its circuit is open while pulsing is taking place in order to let the paystation operate with the paystation control trunk. The numeral 30 represents the relay associated with the nickel chute to control the coin springs C.S. 14. The coin springs C.S. 12 and C.S. 13 are the springs which operate upon the deposit of coins, and restored under the control of the coin magnet 10. The numeral 11 represents springs that normally shunt relay 30, and these springs are operated when the coin magnet 10 is near the end of its stroke during either collecting or refunding operation.

The dial pulsing springs 4 are normally shunted by the coin springs C.S. 12, making it impossible to dial without having first made a suitable deposit to cause the removal of the shunt. Coin springs C.S. 12 open upon deposit of a coin by tripping the coin trigger in the usual way, and C.S. 13 connects the coin magnet 10 to the line. Depositing a single nickel results in the coin operating springs C.S. 14 as the coin passes through the chute, and operates C.S. 12 and C.S. 13 as it continues to fall into the hopper. The opening of C.S. 12 removes one shunt from across the dial springs, but shunts the dial springs at C.S. 14. Depositing a second nickel while the first nickel is on deposit will restore C.S. 14 to remove the second shunt. These spring operations are disclosed in United States Patent No. 2,674,655, issued to Gallagher on April 6, 1954.

Refunding or collecting is done in the usual way by applying a high voltage to the line. The coin voltage first operates coin magnet 10 which moves the platform and starts the coins falling. As the coin magnet armature nears the end of its stroke its power is increased and its coin load is decreased. At that time the armature removes the shunt from relay 30 by opening springs 11 and lets it operate in series with coin magnet 10. Relay 30 is normally shunted so that it will not rob coin magnet 10 of current at the start of its operation and so that relay 30 will have no chance of operating from normal exchange voltage. Relay 30 in operating opens C.S. 14 if it is closed, which depends upon whether an odd or even number of nickels have been deposited.

Figure 2:
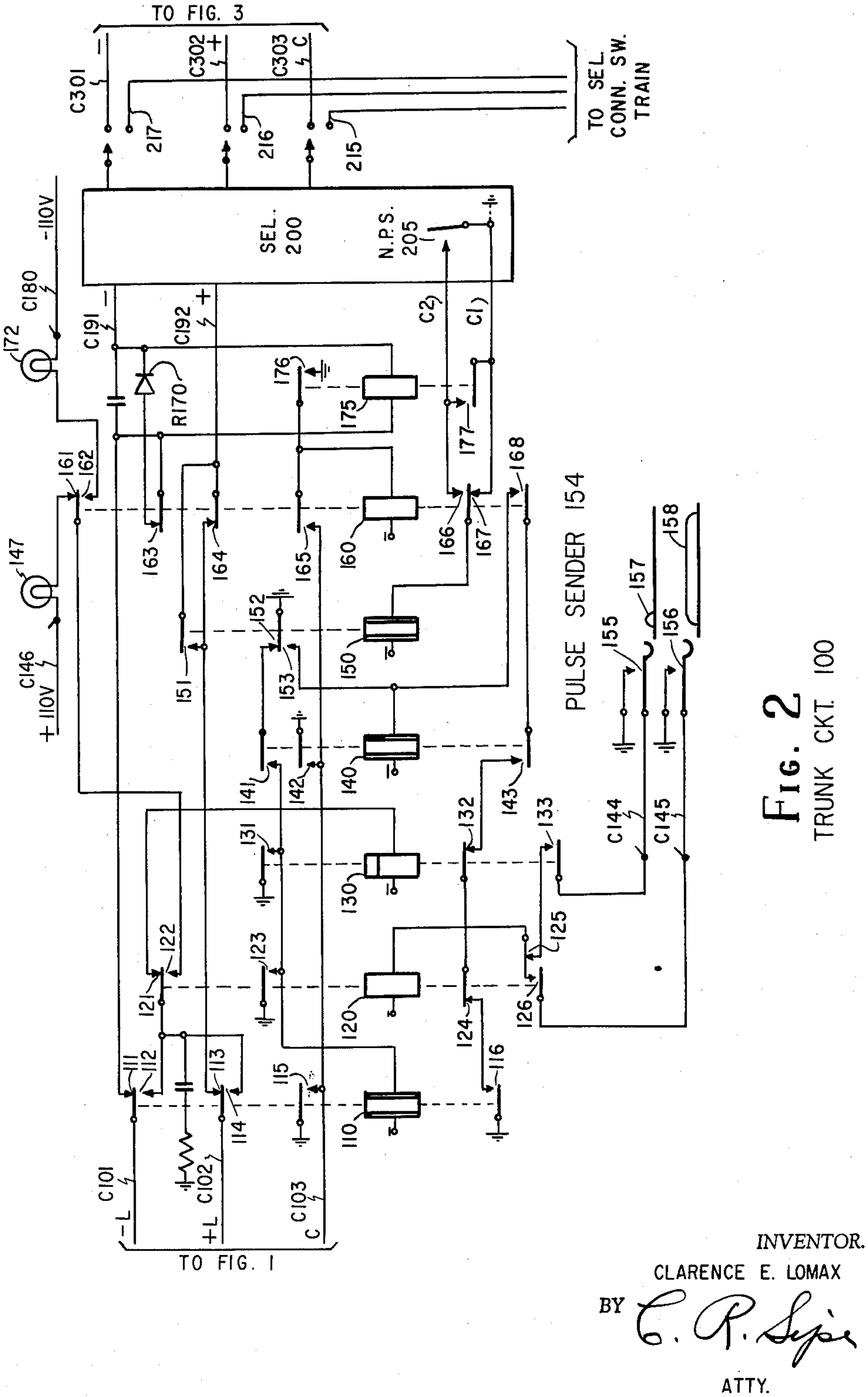

Referring briefly to FIG. 2, a Trunk Circuit 100 is arranged to serve a paystation as shown in FIG. 1 and whose purpose is to permit direct dialling from the paystation instead of using a large paystation pulse repeater. The opening of the coin magnet circuit in the paystation permits direct dialling to the central office switches.

A local call being made will result in relays 150 and 140 operating upon Finder 50 extending a loop circuit to Selector 200. Relay 175 will operate when the call is extended to the called party, and a reversal of battery takes place when the called party answers to prepare trunk circuit 100 for initiating the collection of the coin deposit upon termination of the call, as will be described in detail later on in this specification. The connector utilized may be any well known type which provides the mentioned battery reversal. Relay 160 is the relay which determines, on its operation or non-operation, whether refund or collect potential will be transmitted to the paystation. Also, a coin test relay 130 tests the line to learn if a deposit has been made, and will operate in series with the coin magnet 10 if a deposit has been made. Relay 130 will not operate if no deposit is made because its operating circuit would be opened by the coin springs C.S. 13. If relay 130 operates, it will hold a locking circuit to relay 110 and open a locking circuit to relay 140. Relay 130 will also close a Pulse Sender 154 to relay 120, where it will be operated and locked to a long ground pulse. Relay 120 will apply the collect battery and let relay 130 restore but relay 120 will now hold relay 110 operated. The collect operation will continue as long as the lug 158 on the bottom cam of Pulse Sender 154 keeps spring 156 closed to provide ground to relay 120.

Assuming that after a conversation is completed, a calling party could open the dial pulsing springs without hanging up by turning the dial off normal and hold it in that position when he hangs up. In other known circuits, this would open the line to release the switches, and it would also open the coin magnet to prevent the collection being made. The party would then hold the hookswitch and dial in those positions long enough for a usual coin operation to take place, and he then could first release the dial and then the hookswitch and make another call without paying for it.

With Trunk Circuit 100 the above fraudulent maneuvers are not possible, because upon the finish of a call when the calling party opens the dial pulsing springs without hanging up and thus cause the switch train to release, relay 130 would not operate. If relay 130 cannot operate, relay 120 cannot operate, and relays 110, 140, and 160 would remain operated. Therefore, a person in order to avoid the collection being made would have to open the pulsing springs just after relays 120 and 130 operate and before the coin magnet 10 is sufficiently energized to operate, all requiring an almost impossible task. The large payment for a toll call would be a greater inducement for the calling party to prevent the collection being made. The safeguards described above for local calls would also apply to toll calls.

The general operations of CLR trunks in the past has been to have them reverse battery towards the paystation at the time the operator plugs in to answer. The reverse battery causes the paystation repeater to refund the initial deposit and to also switch the repeater through so that from then on the paystation lines go direct to the CLR trunk. Switching the repeater through conditions it so it will automatically collect the toll deposit at the finish of the call. This arrangement for the present standard CLR trunk represent slow operation in that it delays the operator talking to the party after she has plugged in to answer. It also requires a means to prevent the coin magnet being connected between ground and the negative winding of the CLR trunk after battery has been reversed at the time of answering.

Figures 3, 3A, 3B:
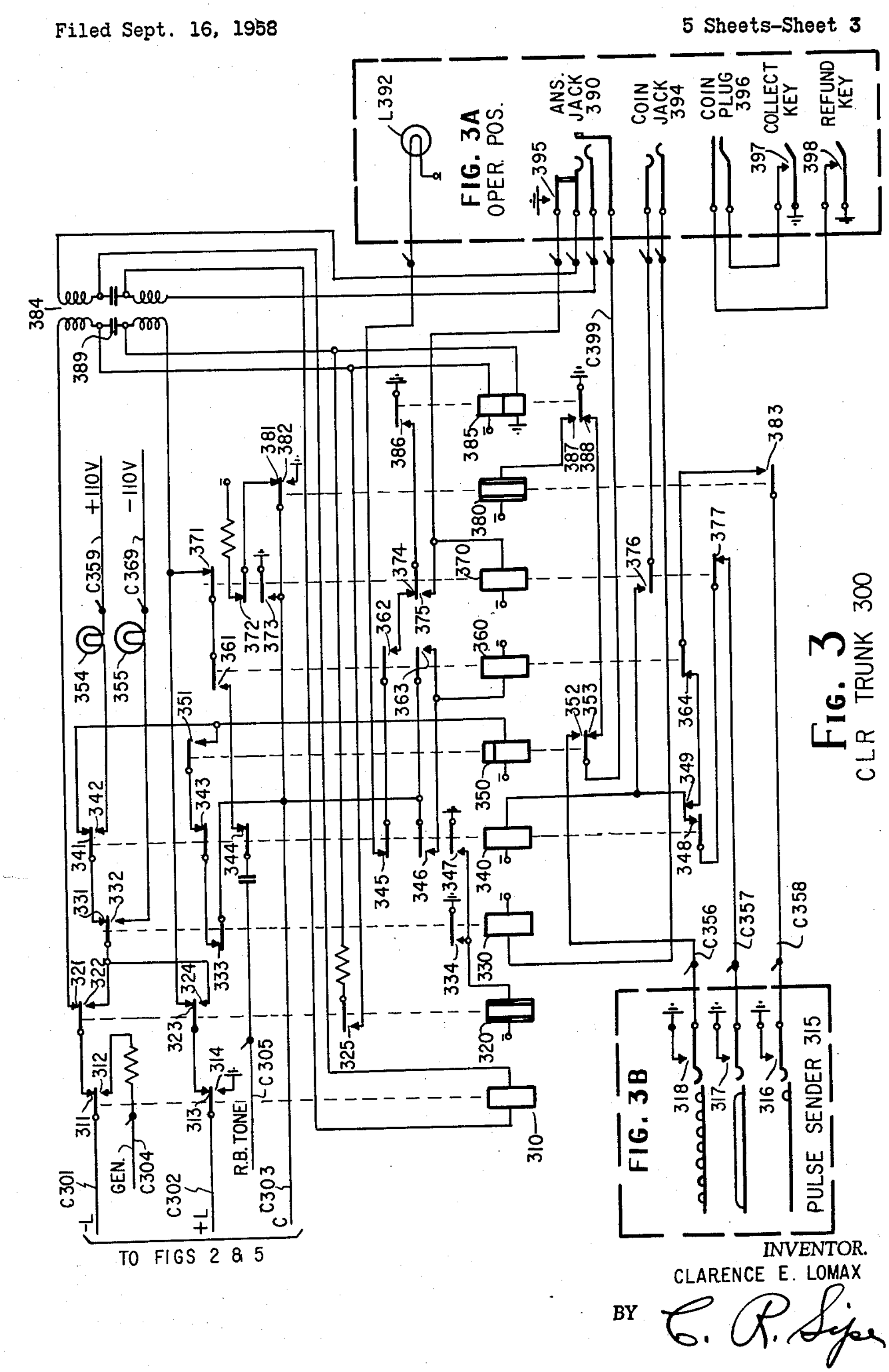
FIG. 3 illustrates a CLR Trunk 300 utilized with FIGS. 1 and 2, and also with FIGS. 4 and 5.
FIG. 3A illustrates a portion of an Operator's Position for controlling the extension of a toll call.
FIG. 3B illustrates a Pulse Sender 315 multipled to a plurality of CLR trunks for controlling an operator's cord lamp, and for controlling refund potential during a refund failure.

The improved Trunk Circuit 100 shown in FIG. 2 overcomes the above faults by using a series polarized relay 175 in the line as mentioned for conditioning the trunk to collect the coin deposit on termination of the call, but it is the CLR Trunk 300 shown in FIG. 3 that initiates the refund of the initial deposit on toll calls. This CLR trunk prevents the operator being signaled until after the refund has been made.

FIG. 3 is the CLR trunk. FIG. 3A is the Operator's Position comprising an operator's lamp L392, an Answer Jack 390, a Coin Jack 394, a Coin Plug 396 for insertion into Coin Jack 394, and a Refund Key for initiating refund potential to the calling paystation and likewise a Collect Key for initiating collect potential to the calling paystation. A suitable cord circuit for the Operator's Position is shown in FIG. 6 of my U.S. Patent 2,921,980, issued January 19, 1960. FIG. 3B is a Pulse Sender 315 or control equipment that serves all CLR trunks in the exchange, and for the purpose of the present description is assumed to be a constantly rotating rotary stepping switch. This pulse sender comprises three separate cams, having an upper cam with evenly spaced lugs which continuously open and close springs 318; a middle cam having a lug extending quite a distance on the periphery of this cam for maintaining springs 317 closed for a long interval in comparison to its opening, and a bottom cam which has a single small lug which closes springs 316 one time for each cycle of rotation.

The CLR Trunk 300 upon seizure by a selector will close a circuit to operate relays 385, 380, 340, 320 and 360 to close refund battery to the calling paystation. Relay 340 being the relay that closes the refund potential locks to the middle spring 317 of Pulse Sender 315 which is a long ground pulse, and its application determines the length of time the potential will be applied. Relay 340 also keeps the circuit to the operator's lamp L392 open, so that the refund operation will take place before the operator is signaled. The refund potential also operates the polarized series relay 175 in the trunk circuit to condition the trunk circuit for initiating the collection of the deposit upon termination of the call. If the refund operation was unsuccessful and relay 340 has restored, when the operator answers, a coin test relay 350 will have operated in series with the coin magnet to close the upper springs 318 of Pulse Sender 315 to the operator's cord lamp (not shown). The Pulse Sender 315 will thus flash the operator's cord lamp to indicate to the operator that the refund operation was unsuccessful. The operator must then insert her Coin Plug 396 into Coin Jack 394 and operate her Refund Key to initiate the extension of refund potential to the paystation.

Figure 4:
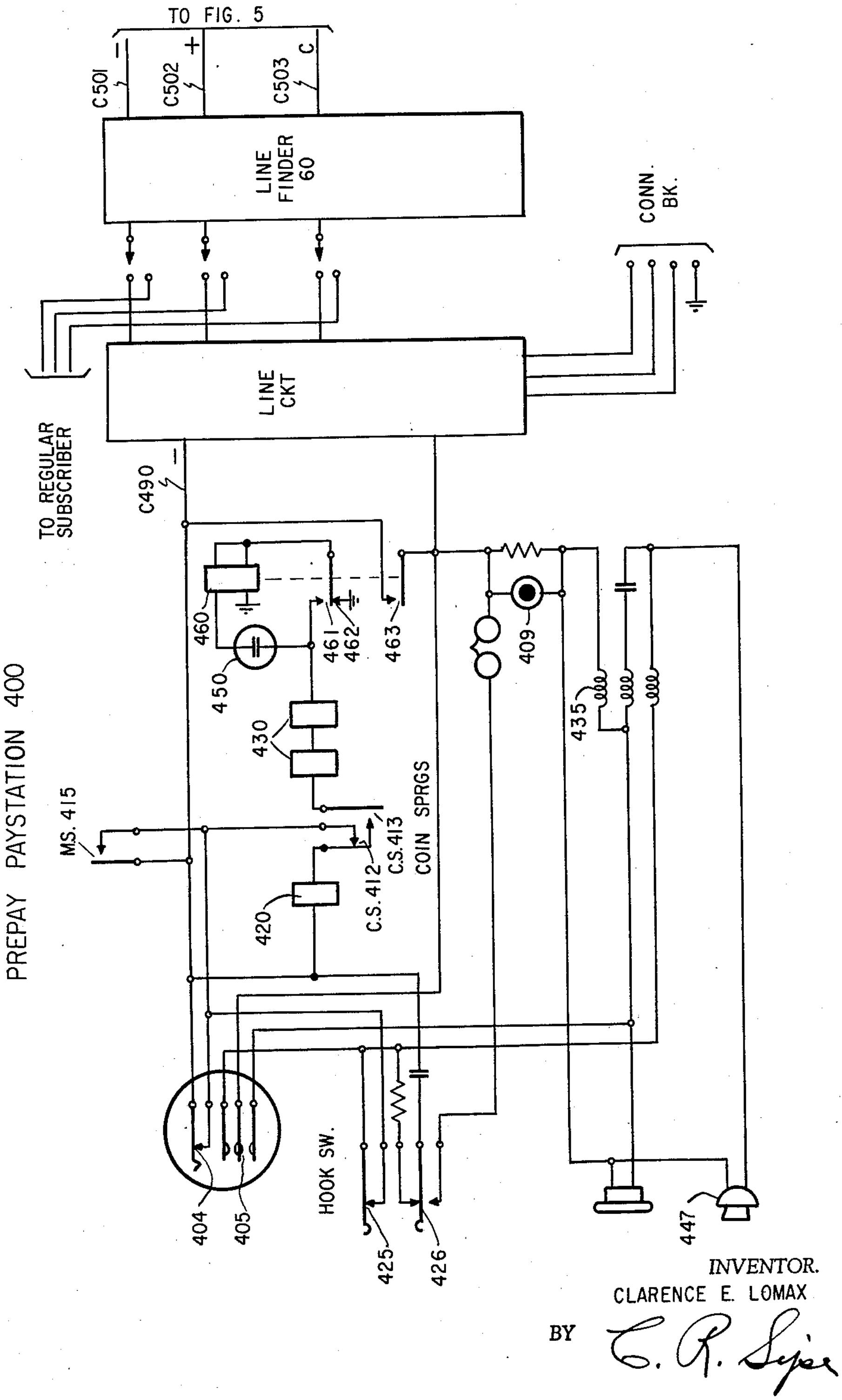
FIGS. 4 and 5 illustrate a modification of FIGS. 1 and 2 comprising a paystation circuit arrangement and a Trunk Circuit 500, the latter being located between a Line Finder 60 and a Selector 600.
Figures 5, 5A:
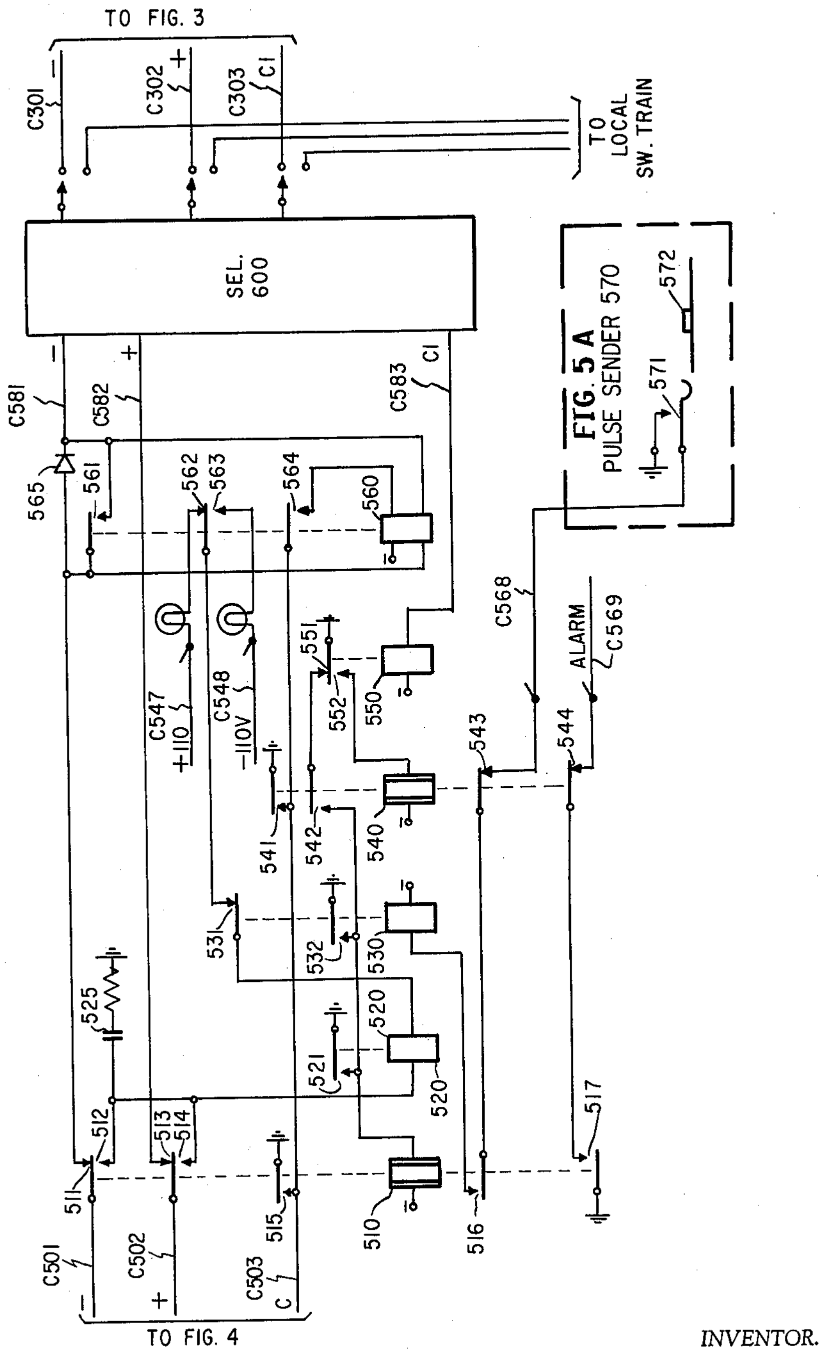
FIG. 5A illustrates a portion of a Pulse Sender 570 multipled to a plurality of trunk circuits, to control the coin disposal pulse time.

FIGS. 4 and 5 are modifications of FIGS. 1 and 2, and differ slightly in the circuitry rather than its overall operation. FIG. 4, for instance, is similar to FIG. 1 except that it has a relay 460 and a neon tube 450 added to it. The neon tube prevents the coin magnet being connected to ground when a coin is on deposit except at a time a high voltage is applied to dispose of the coin load. By not having the coin magnet connected to ground while dialling, the calling party can dial without using a paystation repeater. The nickel chute in this paystation has a microswitch, which operates on odd number of nickels and restores on even numbered. The micro-switch controls springs M.S. 415 in a manner similarly controlled by C.S. 14 in FIG. 1.

Trunk Circuit 500 differs from Trunk Circuit 100 by eliminating one relay. This is accomplished by making the polar series relay 560 control its own polarized shunt and locks itself operated upon receipt of the refund potential. Trunk Circuit 500 also utilizes a Pulse Sender 570 (FIG. 5A) in combination with relays 510, 520, and 530 to repeatedly send collect potential at the termination of a call if the collection is unsuccessful. If the collection is repeatedly a failure, a slow acting alarm system will be initiated to bring in an alarm to a maintenance man, whereby a manual collection will be manipulated.

Having briefly described the invention, a more detailed explanation will now follow.

*Local Call*

A paystation subscriber initiates a call by removing his receiver from the hookswitch to disconnect the ringer from across the line at contacts 3 and completes a circuit for operating his line circuit line relay (not shown) over a circuit from ground on the L1 conductor, dial coin spring 4 in shunt with the springs C.S. 12, hookswitch spring 2, inductance 6, transmitter 7, the coin transmitter 9 and its associated shunt resistor to battery through the line relay over the L2 conductor. The line relay operates to cause the association of a finder selector comprising the Finder 50, Trunk Circuit 100 and Selector 200 with the calling line in any well-known manner.

The calling party cannot extend dial pulses to the selector as long as dial springs 4 are normally shunted by coin springs C.S. 12. He must therefore deposit a coin in an appropriate slot of the coin chute to open coin springs C.S. 12 and close coin springs C.S. 13. The deposit may be one dime, one quarter or two nickels. A dime or quarter will fall into the hopper and in so doing will operate springs C.S. 12 and C.S. 13 by tripping the coin trigger in the usual way to remove the shunt from the dial and connects the coin magnet 10 to the line. Depositing a single nickel results in the coin operating coin springs C.S. 14 as the coin passes through the chute. Coin springs C.S. 14 remains in its locked position after being operated by the first nickel. The nickel continues falling till it is stopped in the hopper, where it operates the C.S. springs 12 and 13 to remove the normal dial shunt, but the dial is now shunted at springs C.S. 14. The coin magnet 10 in this last case is connected to the line so that the single nickel can be refunded even though dialling cannot be effective. However, depositing a second nickel while the first one is on deposit will restore springs C.S. 14, and the last-mentioned shunt is removed. A person cannot dial by depositing a single nickel plus a dim or quarter, but such a deposit can be refunded. The coin control mechanism is shown in United States Patent No. 2,674,655 issued to Gallagher on April 6, 1954.

When the Line Circuit 25 is taken into use by the calling party lifting his receiver, the Line Finder 50 operates in a well known manner to forward ground over control conductor C103 to mark Trunk Circuit 100 as busy to other calling line circuits and extends a loop circuit to Selector 200 before the calling line is found to operate the line relay (not shown) therein. The last-mentioned circuit extending from battery, upper winding of said line relay, − conductor C191, winding of relay 175, contacts 111, conductor C101, over the loop in Finder 50, conductor C102, contacts 113, 164 and + conductor C192 through the lower winding at the line relay to dial tone and ground. Relay 175 is in series over the last-mentioned circuit but is poled not to operate. The closed loop operates relays in Selector 200 in a well-known manner, to return ground over control conductor C1 and operate relay 150. At contacts 153 relay 150 closes an obvious circuit to relay 140. Contacts 151 close to provide an alternate loop path bypassing contacts 164. At contacts 142 relay 140 places ground on control conductor C103 to hold the line circuit equipment when the calling line is found. Contacts 141 close to prepare a circuit to relay 110, and contacts 143 close to prepare a holding circuit for relay 140. The calling line being found results in the finder loop being replaced by the subscriber's closed loop, including the removal of its ground from conductor C103.

As mentioned, the calling subscriber cannot dial unless a suitable deposit has been made. Should he try to dial in this latter case he would continue to receive dial tone after having dialled. He could then, without releasing the connection, make the required deposit and dial. However, if he hangs up without making any deposit, his doing so well open the closed loop and release the selector relays. The latter would remove ground from conductor C1 to restore relay 150. At contacts 153 restored relay 150 opens the circuit to relay 140 however, relay 140 is of the slow-to-release type and remains operated long enough to close a circuit to relay 110 via contacts 152 and 141. Relay 110 operates closing contacts 112 to connect relay 130 to the negative side of the line. Contacts 115 close to provide a multiple ground on control conductor C103. Relay 130 is a testing relay to see if a coin is on deposit and, because none is on deposit, relay 130 will not operate. After a short duration, slow-to-release relay 140 will restore to open at contacts 141 the circuit to relay 110. At contacts 142 one of the multiple grounds is removed from control conductor C103. Because relay 130 did not operate, a pulse will not be sent to operate relay 120, such as will be explained in the ensuing description. Relay 110 aslo being of the slow-to-release type will restore only after a short duration, to in turn, open the testing circuit to relay 130 and remove ground from conductor C103 to release the preceding Line Finder 50 and avail Trunk Circuit 100 for seizure.

When the calling subscriber makes a suitable deposit and if he then hangs up without dialling, the operation is the same as above described except that relay 130 will operate in series with the coin magnet 10. The last-mentioned circuit extending from battery, winding of relay 130, contacts 121, 112, negative conductors C101, L1, coin springs C.S. 13, contacts 11, winding of the coin magnet 10, dial coin springs 5, to ground. Coin magnet 10 will not operate however with the voltage provided, and the resistance of the winding of relay 130. Relay 130 operates closing contacts 131 to hold relay 110 operated when relay 140 eventually restores. Relay 110 keeps control conductor C103 grounded at contacts 115, when relay 140 opens contacts 142. At contacts 133 relay 130 closes a ground pulse to relay 120 via contacts 125 upon the rotating cam 157 closing cam springs 155. Upon receipt of the ground pulse relay 120 will operate, closing contacts 126 and a locking circuit to relay 120 from a long ground pulse provided by cam 158 closing contacts 156. It should be pointed out here that cam 158 as shown in FIG. 2 has a longer outer edge than cam 157 and provides a longer closure of contacts 156 than contacts 155. Also conductors C144 and C145 are multipled to other trunk circuits. At contacts 123 a second holding circuit is provided to relay 110 to maintain the operation thereof. At contacts 121 the circuit to relay 130 is opened causing restoration thereof. Contacts 122 close +110 volt refund battery to coin magnet 10 via conductor C146, lamp 147, contacts 161, 122, 112, conductors C101, L1, springs C.S. 13, contacts 11, windings of coin magnet 10, dial coin springs 5 to ground. Coin magnet 10 energizes which moves the platform in a well-known manner and starts the coins falling into the refund chute. As the coin magnet armature nears the end of its stroke its power is increased and its coin load is decreased. At that time the armature opens contact 11 to remove the shunt from relay 30, and lets it operate in series with magnet 10. Relay 30 in operating restores coin springs C.S. 14 if operated (C.S. 14 operated only upon an odd number of nickels having been deposited as mentioned). The refund battery is applied as long as cam 158 maintains cam springs 156 closed to provide the holding ground to relay 120. When the long ground pulse is opened, relay 120 restores opening contacts 126 to prevent its reoperation upon the next long ground pulse. Contacts 122 open the high voltage to coin magnet 10 and relay 30 to cause deenergization thereof. Contacts 123 open the bolding circuit to relay 110. Contacts 125 close however, relay 130 has contacts 133 opened to prevent relay 120 from operating upon the intermittent closure of cam springs 155. After a short duration relay 110 will restore to release the preceding equipment and avail Trunk Circuit 100 for seizure as before described.

Assuming that the correct deposit has been made and the calling subscriber upon receipt of the dial tone, will proceed to make a local call by dialling a first digit into Selector 200. Selector 200 will respond in a conventional manner to step the wipers to the level of bank contacts corresponding to the digits dialled. Assuming that upon reaching the dialled level, that upon rotation of the wipers, bank contacts 215 are engaged by the control wiper. Contacts 215 containing battery thereon will designate that an idle second rank selector has been engaged and the calling loop will be extended over bank contacts 216 and 217. The extension of a loop circuit to a connector is well-known in the art and will not be further described however, it will be assumed that such an extension has taken place. As mentioned, the connector to be utilized can be of any well-known type, such as a Strowger connector, which will reverse battery upon a called party answering, and returning busy tone upon the called party's line being found busy.

Assuming first that the connector finds the called line busy, the connector will return busy tone to the calling subscriber. The hanging up by the calling subscriber upon receipt of the busy tone will open the loop circuit to release the succeeding equipment including Selector 200. The restoration of Selector 200 will respond in a manner disclosed previously regarding the hanging up after depositing without dialling, to initiate the refunding of the deposit.

If it is assumed that the called line is idle, answering by the called subscriber causes a reversal of battery to take place in the connector in a well-known manner, which will operate relay 175 since it is no longer shunted by rectifier R170. At contacts 176 relay 175 closes an obvious circuit to relay 160. Contacts 177 close to prepare a holding circuit to relay 150. Relay 160 operates closing at contacts 165 a locking circuit for itself to the grounded control conductor C103. Contacts 162 close to prepare —110 volt collect battery to the calling line. Contacts 164 open however the positive line is maintained closed at contacts 151. Contacts 167 open the holding circuit to relay 150 however, at contacts 166 the holding circuit is maintained over a transfer circuit including contacts 177. Contacts 163 open to remove rectifier R170 from being connected in shunt of relay 175 so that relay R175 is no longer polarized.

Since relay R175 is no longer polarized, it will be operated in series with the loop of the calling line regardless of whether or not the answering party hangs up, because positive battery will go through the winding of relay 175, instead of the rectifier R170. Had the rectifier not been removed, relay 175 would restore when the called party hangs up. If the answering party is the first to hang up, battery polarity is restored to normal so that ground through the coin magnet 10 is extended to ground through the pulsing relay of the connector. That will let the pulsing relay restore when the calling party hangs up. But if the calling party hangs up and the called party does not, ground through the coin magnet 10 is extended to battery through the pulsing relay. That will tend to hold the pulsing relay operated after the calling party hangs up and result in the connection not releasing. To prevent that, relay 175 will release when the calling party hangs up by releasing the succeeding equipment including Selector 200. Relay 175 releasing opens the holding circuit to relay 150 at contacts 177. Also, ground was removed from C1 when the calling subscriber hung up. After a short duration slow-to-release relay 150 restores, closing at contacts 152 a circuit to relay 110. Contacts 153 open the circuit to relay 140 however, relay 140 as mentioned will remain operated a short duration. Relay 110 operates closing at contacts 112 the testing circuit to relay 130. Contacts 115 close a multiple ground to control conductor C103 to maintain relay 160 operated. Contacts 116 close a locking circuit to relay 140 to maintain its operation via contacts 124, 132, 143, and 168. Since the correct deposit had been made before making the call, test relay 130 will operate in series with the coin magnet 10 over a previously traced circuit. At contacts 131 relay 130 closes ground to maintain relay 110 locked operated. Contacts 132 open the holding circuit to relay 140. Contacts 133 close the ground pulse circuit to relay 120. Relay 120 will again operate upon the momentary ground pulse upon cam 157 closing contacts 155, and at contacts 126 relay 120 will lock operated to the long ground pulse provided from contacts 156. Contacts 124 further open the holding circuit to relay 140. Contacts 123 close ground to relay 110 to maintain its operation. Contacts 121 open to restore relay 130. Contacts 122 close to send —110 volt collect battery to coin magnet 10; the circuit extending from conductor C180, lamp 172, contacts 162, 122, 112, conductors C101, L1, coin springs C.S. 13, contacts 11, winding of coin magnet 10, coin dial springs 5 to ground. Over this last circuit the collect armature will operate to collect the deposit and remove the shunt from relay 30 by opening contacts 11. Relay 30 will energize in series with coin magnet 10 to restore the coin springs to normal and open the operating circuit to magnet 10 and relay 30 at C.S. 13. Relay 140 after a short duration restores opening at contacts 141 one of the multiple grounds to relay 110. Contacts 142 open one of the multiple grounds to relay 160. When the end of the cam 158 bypasses spring 156 ground is removed from conductor C145 to restore relay 120. The restoration of relay 120 opens the —110 volt collect battery at contacts 122. Contacts 123 open the last holding ground to relay 110. Relay 110 being slow-to-release will restore after a short duration, opening contacts 115 to restore relay 160. Trunk Circuit 100 is now at normal and available for seizure.

*Toll Calls*

A subscriber when making a toll call from a paystation proceeds in a manner already described and the finder 50, trunk circuit 100 and selector 200 are associated with the calling station. After depositing the proper coin value a predetermined digit is dialled to raise the selector switch to a level where the CLR trunks are connected. This level generally being the tenth level, whereby in this case the normal post springs 205 will operate to place ground on both C1 and C2 of the Trunk Circuit 100 for a purpose to be described. The Selector 200 searches for an idle CLR trunk such as 300 over lead C303, contacts 381, 372, and on finding resistance battery, switches through to complete a loop from the calling party's telephone through the finder, trunk circuit and selector and over conductor C301, contacts 311, 321, upper primary winding of repeat coil 384, upper winding of relay 385 to battery, and similarly from the preceding equipment over conductor C302, contacts 313, 323, lower primary winding of coil 384, to ground through the lower winding of relay 385. Relay 385 operates, closing at contacts 387 an obvious circuit to relay 380. Contacts 386 close to prepare a circuit to the operator's lamp L392. Relay 380 operates, opens battery to control conductor C303 and closes ground thereto at contacts 382. Contacts 383 close to prepare a ground pulse from the pulse sender 315 (FIG. 3B) to relay 340. Pulse sender 315 is assumed to be a constantly rotating rotary stepping switch. When the lowermost cam engages spring 316, ground is closed over conductor C358, contacts 383, 364, and 349 to operate relay 340. At contacts 348 relay 340 locks operated to a long ground pulse provided by the middle cam of pulse sender 315 closing spring 317 via conductor C357 and contacts 377. Contacts 342 close to prepare the return of refund battery. Contacts 346 close relay 360 to grounded control conductor C305, while contacts 347 close an obvious circuit to relay 320. Relay 320 operates and closes contacts 322 to apply +110 volt refund battery to the calling party via conductor C359, lamp 354, contacts 342, 331, 322, 311, conductor C301 back over the negative side of the line to operate coin magnet 10 in a manner previously described. Contacts 321 and 323 open the loop circuit to relay 385 however, a loop to the CLR Trunk 300 is maintained through contacts 322 and 324, and relay 385 is maintained operated through the closure of contacts 325. The refund battery being applied is the equivalent of reversing exchange battery in that it is of the polarity that will operate the series polar relay 175 in the Trunk Circuit 100. The refund potential is applied to both sides of the line, but the line voltage loss on the positive side will be enough to permit operation of relay 175 over the negative side of the line.

The refund battery from the CLR trunk goes to the paystation but it also conditions the primary trunk, whereby it will operate to collect the coin deposit upon termination of the call. Relay 175 operates from the refund battery and closes at contacts 176 the circuit to relay 160. Relay 160 operates, opens at contacts 163 the rectifier from across relay 175. At contacts 165 and 176 a second ground is applied to control conductor C103, and locks relay 160 thereto. At contacts 166 the circuit to relay 150 is transferred to ground via both C1 and C2 (contacts 177 are closed).

Referring for the present to the CLR trunk 300, relay 360 operates over the previously mentioned energizing circuit, closing a locking circuit for itself at contacts 363. Contacts 362 close to prepare a circuit to the operator's lamp L392, and contacts 361 close to prepare ring-back tone to the calling partly. After the long ground pulse has terminated from the middle cam of pulse sender 315, relay 340 will restore. The restoration of relay 340 will open +110 volt refund battery at contacts 342, and connect relay 350 to the negative side of the calling line loop. Contacts 345 close ground to the operator's lamp L392 via contacts 362, 374 and 386, contacts 344 closed to prepare ring-back tone to the calling station. Contacts 347 open the circuit to relay 320 however, relay 320 is slow-to-release and remains operated long enough for relay 350 to test for coin refund. Relay 350 is a testing relay and will operate if the coin refund is not a success. However, relay 350 is of high resistance and will not prevent the coin magnet 10 restoring if it is operating correctly, and relay 350 is also slow-to-operate so it will not operate from the inductive kick while the coin springs are restoring. Relay 350 will operate as mentioned, if the coin refund is not a success and will lock operated through its contacts 351 via contacts 343, 333 to grounded control conductor C303 before relay 320 restores, opening its operating circuit at contacts 322.

Assuming for the moment that relay 350 did not operate, and relay 320 has restored, closing at contacts 323 ring-back tone to the calling station via contacts 371, 361, 344 and conductor C305. The operator's lamp L392 will light over the above-mentioned circuit to notify the operator of an incoming call. The operator's circuit as mentioned, is the same as that shown in FIG. 6 of my previously mentioned U.S. Patent 2,921,980, issued January 19, 1960, and will not be described completely. However, the operator plugging into the answer jack 390 will close contacts 395 to operate relay 370 over an obvious circuit. At contacts 371 and 374 relay 370 will open the respective ring-back and operator's lamp circuits. At contacts 373 a second ground is applied to C conductor C303. At contacts 375 relay 370 locks to ground via contacts 386. Contacts 376 close to prepare a circuit to relay 340. Contacts 377 further open the prepared locking circuit to relay 340. It might be pointed out here that when slow-to-release relay 320 restored, the circuit to relay 385 was opened at contacts 325 however, contacts 321 and 323 close at the same time as 325 opens to maintain relay 385 operated over the loop circuit. Thus should the operator find it necessary to change cords and open contacts 395, relay 370 will remain locked operated to contacts 386.

The operator can talk with the calling party when she plugs into jack 390 over repeating coil 384 however, assuming that relay 350 operated when the coin magnet 10 failed to operate successfully, as mentioned, relay 350 would lock operated through its closed contacts 351. At contacts 352, intermittent ground pulses would be applied to conductor C399 of the operator's answer jack. These ground pulses result from a plurality of lugs on the upper cam of pulse sender 315 which intermittently close ground via springs 318. This application of ground pulses will flash the operator's cord lamp (not shown) that the refund had been a failure. The operator would then insert the coin plug 396 into coin jack 394 and operate the refund key to close contacts 398 and extend ground to relay 340 via contacts 376. Relay 340 would operate, close at contacts 347 a circuit to relay 320. Relay 320 would operate, closing at contacts 322 and contacts 342 from operated relay 340, +110 volt refund battery to coin magnet 10 over the negative side of the line. Relay 340 in operating cannot lock to the pulse sender 315 since in this case relay 370 has this circuit open at contacts 377. This will mean that the refund operation will continue only as long as the operator wants it to. Relay 340 operating will open both the prepared operating circuit and locking circuits of relay 350 upon opening contacts 341 and 343 respectively. The removal of plug 396 from jack 394 by the operator, will thus restore relay 340 to remove refund battery and restore relay 320 as before described, and the operator may now converse with the calling party regarding the destination of the call. The operator will then proceed to extend the call to the called party desired in a well-known manner, and converse with the called party.

The operator at the operator's position now requests the calling party to deposit the required coin value. The coins falling thorugh the coin chute generate tones in the coin transmitter 9 which are forwarded over the talking loop to coil 384 and repeated thereover so that the operator may identify the coin value. The operator has the option of collecting the deposit before switching the call through or even during conversation by plugging coin plug 396 into coin jack 394 and operating the Collect Key, although the general policy is automatic collect by the primary trunk circuit at the termination of the call. However, certain conditions warrant prepay on toll calls, and the mentioned plugging and operation of the Collect Key would Close ground from contacts 397 to operate relay 330. At contacts 334 relay 330 would close an obvious circuit to relay 320. Relay 320 operates closing contacts 322 and contacts 332 of relay 330 would conjointly close —110 volt collect battery over the negative side of the line to the coin magnet 10 via conductor C369 and lamp 355. At contacts 333, the prepared locking circuit to relay 350 would be opened. The coin magnet 10 would thus operate in a previously mentioned manner to collect the deposit. It should be pointed out also that relay 350 is slightly slow-to-operate and will not operate from an inductive kick when the operator removes the coin plug to release relays 330 and 320. The removal of the coin plug 396 will restore relays 330 and 320, and conversation may then take place.

If the calling party has replaced his handset to open the calling loop, before the connection is completed with the called party, the operator must re-ring the calling party. On opening of the calling loop, relay 385 will restore, to in turn open the circuit to relay 380 at contacts 387. Contacts 386 open the locking circuit to relay 370 however, relay 370 remains operated to ground at contacts 395. Contacts 388 close ground via contacts 353 and conductor C399 to light the operator's cord lamp (not shown) to indicate to the operator that the calling party has hung up. Relay 380 restores, opens at contacts 382 one of the multiple grounds to control conductor C303. Contacts 383 open to further open a prepared circuit to relay 340. The operator then knows that the calling party has restored. The switch train is held by ground from contacts 373 returned back over the control conductor C303.

On securing the called party the operator proceeds to ring the calling party by operating the Rear Ring Key (not shown) on the operator's position to connect battery to the second upper spring of answer jack 390, upper secondary winding of coil 384, winding of relay 310, lower secondary winding of coil 384, to ground over the second lower spring of answer jack 390. Relay 310 operates to close contacts 312 and 314 to ring the calling party's ringer via ringing current from conductor C304 and back over the calling party's loop to ground at contacts 314. When the operator restores the Rear Ring Key, relay 310 restores to cut off the ringing current. The calling party on hearing the ring removes his handset and when relay 310 is restored reestablishes the loop to relay 385 and the talking loop to the operator. The operator will then request the proper coin deposit if the calling party is at a paystation and then restores the Talk Key to establish the final talking loop.

On release of the connection by the calling party, the loop to relay 385 is opened and it restores to close contacts 388 to operate the cord lamp (not shown) over lead C399, and contacts 353 whereby the operator is signaled that the calling party has disconnected. A similar arrangement is provided on the called end of the cord circuit for operating a cord lamp in response to the called party disconnecting. The operator now removes her answer plug to disconnect the cord lamp and restore relay 370. Slow-to-release relay 380 and relay 370 restoring opens ground to conductor C303 at contacts 382 and 373 respectively to restore Selector 200 in a well-known manner. Battery is placed on conductor C303 from contacts 372 and 381 so that the CLR Trunk 300 is indicated as idle on subsequent calls thereto.

The Selector 200 on restoring removes ground from conductors C1 and C2 to restore relay 150, opening at contacts 153 the circuit to relay 140. However, relay 140 is slow-to-release and remains operated to permit relay 150 to close a circuit to relay 110 via contacts 152 and 141. Relay 110 operates and closes a locking circuit to relay 140 before relay 140 has time to restore; the circuit extending from ground, contacts 116, 124, 132, 143 and 168. At contacts 112 the coin test circuit is closed to coin test relay 130. Contacts 115 close ground to control conductor C103 to maintain relay 160 operated, and holds the preceding equipment. As mentioned, the normal procedure is to collect the coin deposit at the termination of the call, whereby coin test relay 130 will operate in series with the coin magnet 10. The operation of relay 130 will close ground at contacts 131 to maintain relay 110 operated. At contacts 132 relay 130 opens the locking circuit to relay 140 to cause restoration thereof. Contacts 133 close ground from the pulse sender 154 to relay 120, which operates and locks as previously described. The operation of relay 120 will thus close at contacts 122 —110 volt collect battery to coin magnet 10 to collect the deposit in a manner previously described. The equipment will thus restore in a manner previously disclosed.

The modifications shown in FIGS. 4 and 5 will now be described, utilizing FIG. 3 as the CLR trunk.

*Local Call*

The prepay paystation shown in FIG. 4 is a modification of FIG. 1, and the trunk circuit shown in FIG. 5 is a modification of FIG. 2 as mentioned previously. A call utilizing these modified circuits will now be described.

A paystation subscriber initiates a call by removing his receiver from the hookswitch to disconnect the ringer from across the line at contacts 426 and completes a circuit for operating his line circuit line relay (not shown) over a circuit from ground on the one line conductor 490, dial springs 404 in shunt with the springs C.S. 412, hookswitch springs 425, inductance 435, transmitter 447, the coin transmitter 409 and its associated shunt resistor to battery through the line relay over the other line conductor. The line relay operates to cause the association of a finder selector comprising the Finder 60, Trunk Circuit 500 (FIG. 5) and Selector 600 with the calling line in any well-known manner.

The calling party cannot dial a digit on the selector as long as dial springs 404 are shunted by coin springs C.S. 412. He therefore deposits a coin in an appropriate coin chute to open coin springs C.S. 412 and close coin springs C.S. 413. The deposit may be one dime, one quarter or two nickels. A dime or quarter will fall into the hopper and in so doing will operate springs C.S. 412 and C.S. 413 by tripping the coin trigger in the usual way, to remove the shunt from the dial and connect the coin magnet 430 to the line. Depositing a single nickel operates the coin springs C.S. 412 and C.S. 413 as above to remove the shunt from the dial however, the microswitch in the nickel chute will operate to close springs M.S. 415 to close a second shunt on the dial springs. The deposit of a second nickel will however restore the microswitch and open springs M.S. 415 to remove the shunt and permit dialling. The coin magnet 430, restoring magnet 420 and relay 460 are now in series with each other and are connected between ground and the positive side of the line. The neon tube 450 is also in series with them and prevents current flowing through them at this time. Magnet 420 is a restoring magnet for the microswitch and operates each time coins are disposed of. The microswitch springs M.S. 415 will not require a restoring pulse unless an odd number of nickels have been deposited.

The Line Finder 60 being taken into use extends a loop to the associated Selector 600 before the calling line is found. This closed line loop operates relays in this selector in a well-known manner to ground conductor C583. This closed loop extending from battery, upper winding of a pulsing relay (not shown) in Selector 600, conductor C581, lower winding of relay 560, contacts 511, conductor C501, the finder loop, conductor C502, contacts 513, conductor C582 to dial tone and ground through the lower winding of the pulsing relay. Since relay 560 is shunted by rectifier 565, it is poled not to operate over the above-traced circuit. The ground on conductor C583 closes an obvious circuit to relay 550. Relay 550 operates, closing at contacts 552 an obvious circuit to relay 540. Relay 540 operates closing ground to control conductor C503 to hold the preceding equipment when the calling line is found. The line being found, opens the first closed loop but the calling party's telephone now completes the regular calling loop. The party will now hear dial tone, and he must make the aforementioned coin deposit before he can dial.

If the calling party hangs up without making a deposit, the loop is opened to allow the selector relays to restore in a well-known manner. This will remove ground from C conductor C583 to restore relay 550. Relay 550 restoring opens at contacts 552 the circuit to relay 540 however, relay 540 is of the slow-to-release type and remains operated long enough for relay 550 to close at contacts 551 an obvious circuit to relay 510. Relay 510 operates closing at contacts 512 and 514 the application of +110 volt refund battery to the line for attempting a refund, however the circuit to the coin magnets 430 are opened at C.S. 413 since no deposit was made. Thus, after a short duration slow-to-release relay 540 will restore, opening at contacts 541 ground to C conductor C503. At contacts 543 the circuit to relay 510 is opened however, relay 510 is slow-to-release and remains operated for a short duration. After relay 540 retores and before relay 510 restores, the common Pulse Sender 570 may or may not send a ground to relay 530. The Pulse Sender 570 consists of a constantly rotating cam which if being in a certain rotated position causes a lug 572 thereon to close spring 571. A ground pulse in the last-mentioned operated condition is extended over conductor C568 via contacts 543 and 515 to operate relay 530. If the ground pulse is extended to relay 530, relay 530 operates to open the high voltage at contacts 531 and close ground at contacts 532 to delay the release of relay 510. Relay 510 however, will have ample time to release before another pulse can be sent to relay 530. The eventual release of relay 510 will thus avail Trunk Circuit 500 for seizure.

The calling party making a deposit and then hanging up without an answer to the call, causes the release of the above-mentioned relays in the same manner; but in this case, relay 520 operates in series with the coin magnet 430. The last circuit extending from +110 volt refund battery over conductor C547 and associated lamp, contacts 562, 531, winding of relay 520, contacts 512, conductors C501, C490, winding of magnet 420, coin springs C.S. 413, windings of coin magnet 430, neon tube 450, upper winding of relay 460 and contacts 462 to ground. Relay 460 has an upper winding of high resistance and the lower winding of low resistance, and the lower winding is really the armature end winding of a two section coil. This lower winding is normally shunted at contacts 462 making this relay slow-to-operate. The mentioned high voltage refund battery will fire the neon tube 450 and cause relay 460 to operate through its upper high resistance winding. When relay 460 operates, it closes contacts 461 to shunt the high resistance winding and the neon tube 460, and removes the shunt at contacts 462 from the low resistance winding . Thus, only the low resistance winding of relay 460 is now in series with coin magnet 430 and magnet 420 to permit these latter magnets both to get full current over the two line wires. The magnets 420 and 430 will both energize whereby magnet 420 will restore the microswitch if an odd number of nickels had been deposited and open M.S. 415; and coin magnet 430 will respond by refunding the deposit and open C.S. 413 to deenergize magnets 420 and 430, neon tube 450 and relay 460. As mentioned, relay 520 operated over the above-traced refund circuit closing at contacts 521 ground to maintain relay 510 operated. Also, as previously described relay 540 being slow-to-release will eventually release to close contacts 543, however the ground pulse from the Pulse Sender 570 cannot reach relay 530 before relay 540 restores. This means that the release time of relay 540 is the minimum time for disposing of coins. The ground pulse to relay 530 will cause operation thereof, and open the high voltage refund at contacts 531, to restore relay 520. At contacts 532 ground is closed to relay 510 to delay the restoration thereof. The condenser 525 will absorb the inductive kick when the high voltage is opened. When the Pulse Sender 570 removes the ground pulse relay 530 will restore. The restoration of relay 530 will again place high voltage on the line upon closing contacts 531 before relay 510 restores to learn if the coin disposal operation was a success. If it was a success relay 520 will not operate again, and the release of relay 530 will open the circuit to relay 510 which will eventually restore and avail Trunk Circuit 500 for seizure. If it was not a success, relay 520 will operate again, hold relay 510 operated, and the disposal operation will be repeated.

It will be seen that an alarm circuit is closed at contacts 517 and 544 when relay 510 operated and after relay 540 restored. This alarm, which is common for all common trunk circuits, must be rather slow-acting so it will not sound an alarm for an ordinary disposal of coins. If the coin disposal is a failure, attempts will be made repeatedly as explained to make it a success. Instead of letting this continue indefinitely a maintenance man is given an alarm. He can then learn which paystation is in trouble and can manually release the switches.

It will be appreciated that the ground pulse to relay 530 may be sent fairly soon or fairly late after the coin disposal operation has been started. However, it cannot be sent until relay 540 restores. This means the coin disposal pulse will always be as long as it takes relay 540 to restore. The release time of relay 540 is of a particular duration whereby even the shortest coin disposal pulse should be effective. However, in the event that the coin pulse is not long enough to be effective, relays 530 and 520 will hold relay 510 operated, so that the disposal pulse will be repeated.

Assuming that the correct deposit has been made, and the calling party dials a local subscriber's directory number via a local switch train (not shown) and the called station is found idle, the called party answering will reverse battery to operate relay 560. Relay 560 operates closing its "X" contacts 564 first to lock operated through its upper winding to the ground on control conductor C503. At contacts 561, relay 560 completes an obvious shunting circuit to exclude its lower winding and rectifier 565 from the negative line conductor. At contacts 563 −110 volt collect battery is prepared for extension to the calling line. Relay 560 in locking over its upper winding and by shuntng its lower winding, improves voice transmission, and also prevents the relay from releasing at the time that the called party hangs up.

When the call is terminated, disposal of the coin deposit is similar to that previously described, with the exception that −110 volt collect battery from conductor C548 is sent back to coin magnet 430 to collect the deposit.

*Toll Call*

A subscriber when making a toll call from paystation 400 proceeds in a manner similar to that previously described and the finder 60, trunk circuit 500 and selector 600 are associated with the calling station. After depositing the proper coin value a predetermined digit is dialled to raise the selector switch 600 to a level where the CLR trunks such as 300 are connected. The selector searches for battery, which indicates an idle CLR trunk, over a path including lead C303, contacts 381 and 372 and on finding battery completes a loop from the calling party's telephone through the finder 60, trunk circuit 500 and selector 600 and over contacts 311, 321, upper primary winding of repeat coil 384 to battery through the upper winding of relay 385 and over contacts 314, 323, lower primary of coil 384 to ground through the lower winding of relay 385.

The following operations will be briefly described since the circuits were traced previously. The operation of relay 385 closes a circuit to relay 380. Relay 380 operating closes a ground pulse circuit from Pulse Sender 315 to relay 340, and grounds control conductor C303. Relay 340 will operate upon receipt of the ground pulse; lock to a long ground pulse from Pulse Sender 315; and close circuits to relays 320 and 360. Relay 320 operates in combination with relay 340 to close +110 volt refund battery to the coin magnet 430. At the end of the long ground pulse, relay 340 restores to in turn, in combination with the operation of relay 360, close ring-back tone to the calling station; close a circuit to the operator's lamp L392; and cut off the refund battery.

Upon receipt of the refund battery from the CLR trunk 300, relay 560 will operate due to the polarity of the received battery. Relay 560 operating, locks as before, and the closing of its contacts 561 permits the coin magnet to receive more current. As in the previous case, the CLR trunk does not reverse battery because it will be the refund pulse from the CLR trunk that positions relay 560 to collect at the finish of the call. Thus, the coin magnet 430 and relay 460 will operate as before to refund the deposit. At the termination of the refund pulse, relay 560 will have locked operated through its "X" contacts 564 to ground at contacts 541.

The operations of the CLR Trunk 300 by the operator at the Operator's Position have been previously described and only the effects thereof will be described regarding Trunk Circuit 500 and Paystation 400. The operator, upon plugging into her answer jack 390, can converse with the calling party to get the directory number wanted. The operator will then proceed to extend the call to the desired party, upon finding the called party's line idle.

In the event of a refund failure, relay 350 would operate as before described, necessitating the operator to insert her Coin Plug 494 into Coin Jack 397 and operate the Refund Key. This operation would extend +110 volt refund battery to the coin magnet in a manner previously described.

The operator, upon extending the call to the called party, will now request the calling party to deposit the required coin value. The coins falling through the coin chute generate tones in the coin transmitter 409 which are forwarded over the talking loop to coil 384 and repeated thereover so that the operator may identify the coin value. The operator releases her Talk Key and conversation will then take place.

If the calling party has replaced his handset to open the calling loop, before the called party is connected, the operator must re-ring the calling party. On opening of the calling loop, relay 385 restores to extinguish the operator's lamp L392, and close a circuit to light the operator's cord lamp as previously described. The operator would then operate her Rear Ring Key to close a circuit to relay 310 to initiate the ringing in a manner previously described. When the operator restores the Rear Ring Key, relay 310 restores and cuts off the ringing current. The calling party on hearing the ring removes his handset to reestablish the loop to relay 385 and the talking loop to the operator, the operator will then request the proper coin deposit and establish the described final talking connection.

On release of the connection by the calling party, the loop to relay 385 is opened and it restores to close contacts 388 for lighting the cord lamp over lead C399 whereby the operator is signaled that the calling party has disconnected. A similar arrangement is provided on the called end of the operator's cord circuit for lighting another cord lamp in response to the called party disconnecting. The operator now removes her answer plug from Answer Jack 390 to disconnect the cord lamp and open contacts 395 to restore relay 370. Contacts 387 being open enables relay 380 to restore. Contacts 382 and 373 being open removes ground from Control Conductor C303 to release Selector 600. Battery is placed on the C303 conductor from contacts 381 and 372 so that the CLR Trunk 300 is indicated as idle on calls thereto.

The Selector 600 on restoring removes ground from lead C583 to restore relay 550. Relay 550 restoring opens at contacts 552 the circuit to relay 540 however, relay 540 is slow-to-release and remains operated long enough to close a circuit via contacts 551 and 542 to operate relay 510. Relay 510 operates closing at contacts 514 the application of −110 volt collect battery via conductor C548 and associated lamp, contacts 563, 531, winding of relay 520 and over conductor C502, Finder 60 and the line circuit to operate the coin magnet in a manner previously described to collect the deposit. When relay 540 eventually restores, it prepares at contacts 543 a circuit to relay 530. At contacts 541 the operating circuit to relay 560 is opened however, relay 560 remains locked operated to contacts 515. Upon the cam of Pulse Sender 570 rotating to the position where lug 572 engages spring 571, ground is closed over conductor C568, contacts 543 and 516 to operate relay 530. Relay 530 operating, closes at contacts 532 an obvious circuit to maintain relay 510 operated. At contacts 531 the collect battery is removed from the calling line. Relay 530 operates long enough from the ground pulse to maintain relay 510 operated. This is done in case the collect operation was unsuccessful.

Assuming that the collect operation was unsuccessful, when relay 530 restores it recloses the −110 volt battery through relay 520 which reoperates in series with the coin magnet. Thus the operation described above will be repeated until the coin collection is a success, or an alarm is brought in over conductor C569. A successful coin collection will open the series circuit for relay 520 when the collect potential is applied to prevent reoperation thereof. Thus, after a short duration slow-to-release relay 510 will restore to open at contacts 515 the holding circuit for the preceding finder and open the locking circuit for relay 560, to cause release thereof. Contacts 516 opening prevent any further operation of relay 530. Contacts 511 and 513 close to make Finder 60 and Selector 600 available for future calls.

While there has been described what is at present considered to be the preferred embodiments of the invention, it will be understood that various modifications may be made therein, and it is intended to cover in the appended claims all such modifications as fall within the true spirit and scope of the invention.

Having described my invention in detail, what I claim and desire to have protected by issuance of Letters Patent of the United States is set forth in the appended claims.

What is claimed is:

1. In a telephone system, a prepay paystation of the type having a coin magnet for refunding and collecting a coin deposit upon receipt of a first or second high voltage potential, said coin magnet connected across one side of the calling line upon receipt of a suitable coin deposit, a relay connected in series with said coin magnet including an interposed neon tube, said relay having a high resistance winding and a low resistance winding, shunt circuit means including said low resistance winding normally shunted to prevent operation of said relay by an inductive kick, means responsive to the receipt of said first or second high voltage potential for firing said tube and operating said relay through its high resistance winding, and means operated by said operated relay for shunting its high resistance winding and said neon tube to operate said relay through its low resistance winding to permit said coin magnet to receive the full current of said high voltage potentials.

2. In a telephone system having prepay paystations of the type that utilize a coin magnet for refunding and collecting a coin deposit upon receipt of high voltage refund or collect potentials, a common paystation primary trunk circuit, means operated in response to the initiation of a call by a calling paystation for extending a calling connection including a pair of line conductors to said primary trunk circuit, a relay in said primary trunk circuit connected across one of said line conductors of said calling connection, a rectifier connected in parallel with said relay for polarizing said relay to a particular direction of current flow, whereby said relay is non-responsive to normal directional current flow, an operator position for completing desired calling connections, a combined line and recording trunk terminating at said operator position, switching means for extending said calling connection to said combined line and recording trunk, means in said combined line and recording trunk for extending said calling connection to said operator position, a call signal at said operator position for indicating incoming calls thereto, a source of high voltage refund potential in said combined line and recording trunk, means including timing means in said combined line and recording trunk operated in response to said calling connection being extended thereto for automatically returning said high voltage refund potential over said calling connection for a particular duration of time to operate said coin magnet in a refund operation and to operate said relay, means for operating said call signal at the expiration of said particular duration of time to signal said operator position that said incoming call is awaiting disposition, means for maintaining said relay operated independent of said connection with said one line conductor, means operated in response to said operation of said relay for excluding said rectifier and said relay from said parallel connection with said one line conductor, a source of high voltage collect potential in said paystation trunk, a normally incomplete coin disposal control circuit in said primary trunk, means operated in response to said operation of said relay for connecting said high voltage collect potential to said coin disposal control circuit, means for releasing said switching means in response to the termination of said calling connection, and means including relay means controlled in response to said release of said switching means for connecting said coin disposal control circuit to said connection extending to said calling paystation, whereby said high voltage collect potential operates said coin magnet in a collect operation.

3. In a telephone system such as described in claim 2, including coin collect testing means in said primary trunk circuit normally unoperated in response to a successful coin collect operation and operated only in response to an unsuccessful coin collect operation, means operated by said coin collect testing means in response to said coin collect operation testing unsuccessful for reoperating said last-mentioned means, whereby said coin disposal control circuit is reconnected to said calling connection to repeat said coin collect operation, an alarm circuit in said primary trunk circuit for indicating unsuccessful coin collect operations, and means operated in response to each operation of said last-mentioned means for completing said alarm circuit simultaneous with each said connection of said coin disposal control circuit with said calling connection.

4. In a telephone system such as claimed in claim 2, including refund testing means in said combined line and recording trunk normally unoperated in response to a successful coin refund operation and operated only in response to an unsuccessful coin refund operation, a refund failure signal circuit terminating at said operator position, means operated by said refund testing means in response to said coin refund operation testing unsuccessful for completing said refund failure signal circuit to said operator position to indicate said failure of said refund operation thereat.

References Cited in the file of this patent

UNITED STATES PATENTS

| | | |
|---|---|---|
| 2,039,631 | Cesareo | May 5, 1936 |
| 2,082,097 | Cesareo | June 1, 1937 |
| 2,271,681 | Davidson | Feb. 3, 1942 |
| 2,616,974 | Dehn | Nov. 4, 1952 |